United States Patent [19]

Bacon

[11] 4,267,799
[45] May 19, 1981

[54] ANIMAL TRAINING AND AMUSEMENT DEVICE

[76] Inventor: Roger C. Bacon, 1042 N. Sweetzer Ave., Los Angeles, Calif. 90069

[21] Appl. No.: 90,489

[22] Filed: Nov. 1, 1979

[51] Int. Cl.³ ............................................. A01K 15/02
[52] U.S. Cl. ..................................................... 119/29
[58] Field of Search ................. 119/29; 273/85 R, 88; 194/12, DIG. 11

[56] References Cited

U.S. PATENT DOCUMENTS

| | | | |
|---|---|---|---|
| 2,796,045 | 6/1957 | Breland | 119/29 |
| 3,204,608 | 9/1965 | Snitz | 119/29 X |
| 3,297,324 | 1/1967 | Evans et al. | 119/29 X |
| 3,611,996 | 10/1971 | Wegner | 119/29 |
| 3,727,740 | 4/1973 | Evans et al. | 119/29 X |

*Primary Examiner*—Hugh R. Chamblee
*Attorney, Agent, or Firm*—Martin R. Horn

[57] ABSTRACT

An animal training and amusement device including a ball-throwing means and a food dispensing means. Both means can be activated by the animal alone without human intervention. The device also includes a food release means which is activated by the animal placing the retrieved ball on the top of the device. The device will reset in its original position without human intervention.

36 Claims, 6 Drawing Figures

ANIMAL TRAINING AND AMUSEMENT DEVICE

BACKGROUND OF THE INVENTION

1. Field of the Invention

This invention relates to animal training and amusement devices, and more particularly, to the design and construction of a ball-throwing device which rewards and resets automatically without human intervention.

2. Prior Art

There are a wide variety of devices available to train animals. Some devices will automatically throw balls for retrieval. Others are designed to automatically reward the animal with food.

Examples of such devices are disclosed in U.S. Pat. Nos. 3,611,996; 2,796,045 and 3,204,608. The '996 patent to Wegner teaches a ball-throwing device which when activated by the animal automatically throws a ball for the animal to chase. However, this is the extent of its capabilities. There is no rewarding mechanism, nor is there an automatic reset mechanism. The device must be reset by hand before its next use.

The '045 patent to Breland teaches a device which has the animal perform a task which results in the automatic reward of the animal. The device is also capable of resetting automatically. However, this is a device designed primarily for chickens and does not throw a ball and is not useable by dogs.

Although adaptable for use by other animals, this device has other drawbacks. There is required only a single, simple act by the animal of jumping onto a platform. It does not teach the animal to chase after a ball and retrieve it to the place from which it was thrown. Thus the animal does not get a significant amount of exercise from the use of the device, nor does it learn an activity known to provide great amusement to animals, especially dogs, namely fetching a ball.

The '608 patent to Snitz teaches an automatic feeding device which will automatically reset. However, the device merely requires the performance of a simple activating task by the animal and does not incorporate any ball-throwing capability or requirement of return of a ball.

However, there are no devices presently available which incorporate all of the features of ball-throwing capability, automatic reward capability, and automatic reset (i.e., reset by the animal) capability so that the device is capable of repeated operation without the necessity of human intervention.

SUMMARY OF THE INVENTION

It is a primary object of this invention to provide a device which when activated by the animal projects a ball automatically without human assistance.

It is another object of this invention to provide a device of the type described which automatically releases a reward for the animal upon retrieval of the ball.

It is yet another object of this invention to provide a device of the type described that is automatically reset by the animal and is capable of repeated use without human intervention.

The animal can be trained to pull on an object which is connected by a cord to the trigger means on the inside of the unit. As the trigger means slides back in the unit it also causes a spring-loaded piston to slide backwards. At a certain position, the piston assembly disengages from the trigger means whereupon the spring tension causes the piston assembly to shoot forward and strike a ball which is at rest in the path of the piston assembly, causing the ball to be projected outward from the unit.

In addition, when the cord causes the trigger means to slide backwards, said trigger means also will selectively engage a dispensing means. The dispensing means includes a sprocket on the circumference of a disc which when engaged by the trigger means causes the disc to be rotated about a portion of its axis. Said disc forms the bottom of a reservoir which can be filled with food pellets. Around the inner-circumference of the disc and on the interior of the reservoir are situated a number of holes into each of which a single food pellet will fall. As the disc is rotated, a new hole containing a food pellet will be positioned over a drop hole, which is situated over a chute. The food pellet will fall through the drop hole and come to rest on top of a horizontal, spring-loaded hinged plate.

When the dog retrieves the ball, brings it back to the unit and lays it anywhere on the roof of the unit, the slope of the roof of the unit will cause the ball to roll towards the front corner of the unit directly above its original resting position, where it drops through a hole into the ball loading chamber. As the ball drops down into the loading chamber, it will strike a hinged trip plate which is in linkage with the spring-loaded hinged plate now holding the food pellet which was released during the pull stroke of the trigger means. As the hinged trip plate in the loading chamber is depressed by contact with the descending mass of the ball, so is the hinged plate holding the food pellet. The food pellet then drops the remainder of the distance down the chute and comes to rest in a cup. There the animal may receive its reward. At this point all spring-loaded mechanisms in the unit have returned to rest position and are ready for repeat operations.

The novel features which are believed to be characteristic of the invention, both as to its organization and method of operation, together with further objectives and advantages thereof, will be better understood from the following description considered in connection with the accompanying drawings in which a presently preferred embodiment of the invention is illustrated by way of example. It is to be expressly understood, however, that the drawings are for the purpose of illustration and description only, and are not intended as a definition of the limits of the invention.

DETAILED DESCRIPTION OF THE INVENTION

Figure 1:
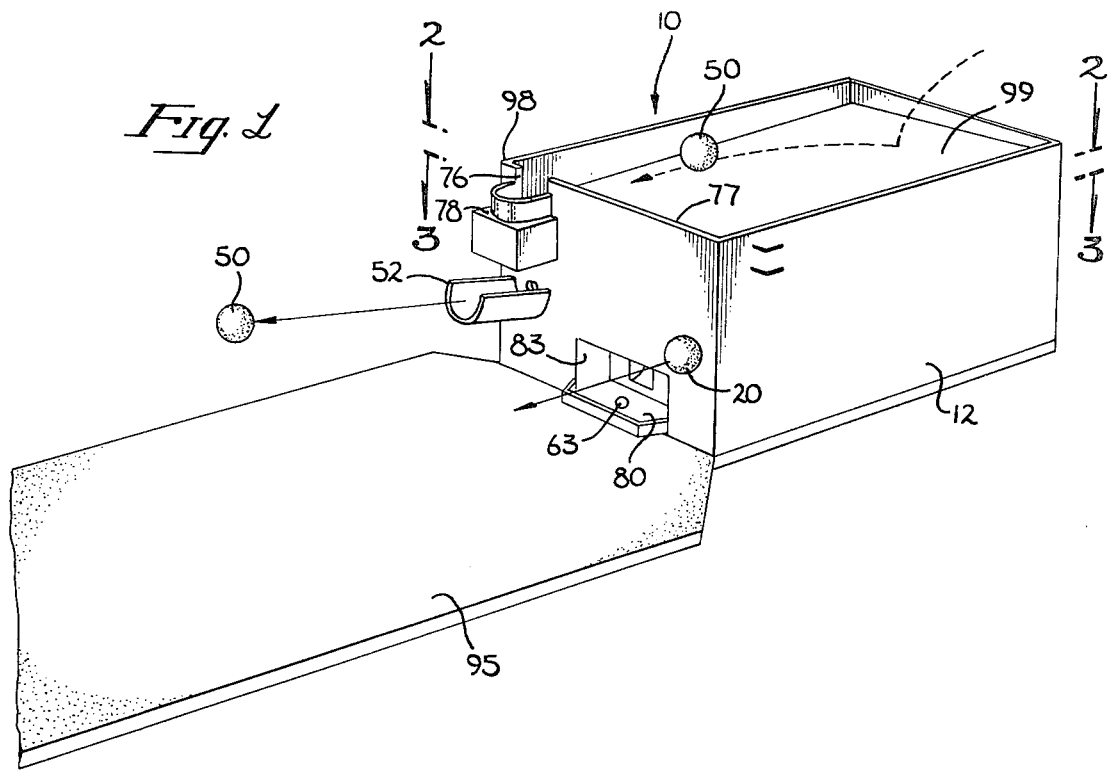
FIG. 1 is a perspective view of the animal training and amusement device of the present invention.
Figure 2:
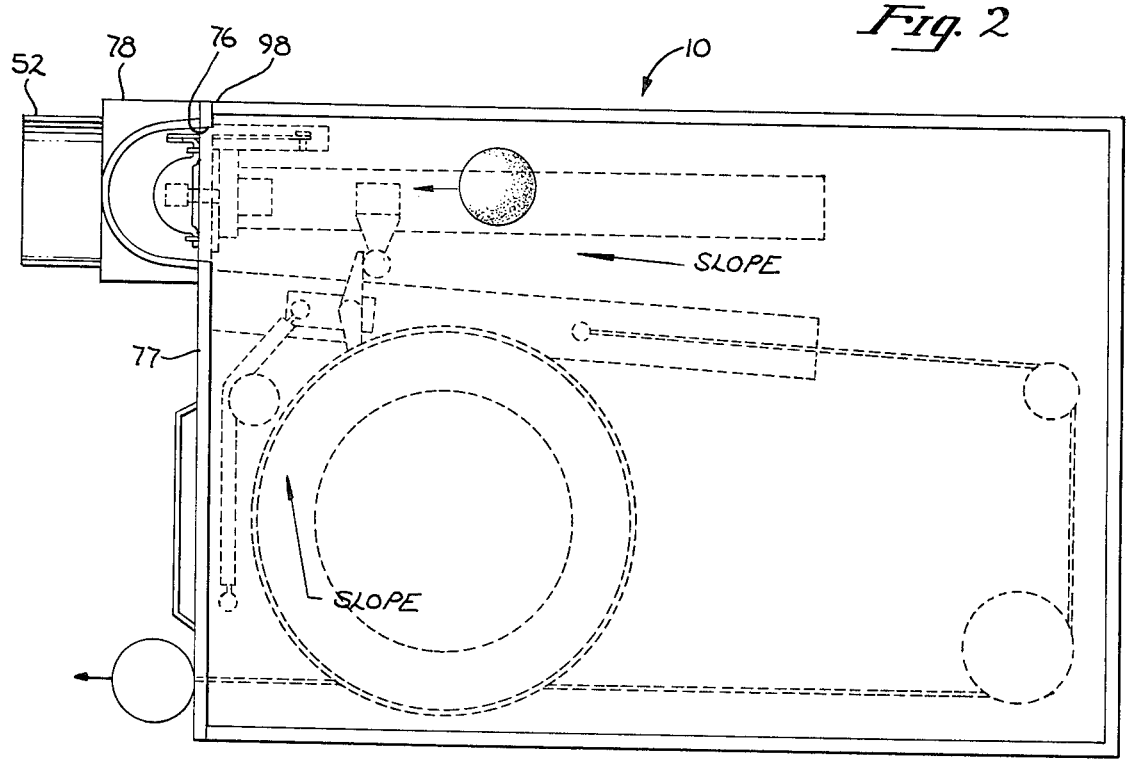
FIG. 2 is a plan view of the animal training and amusement device of the present invention taken along lines 2—2 of FIG. 1.
Figure 3:
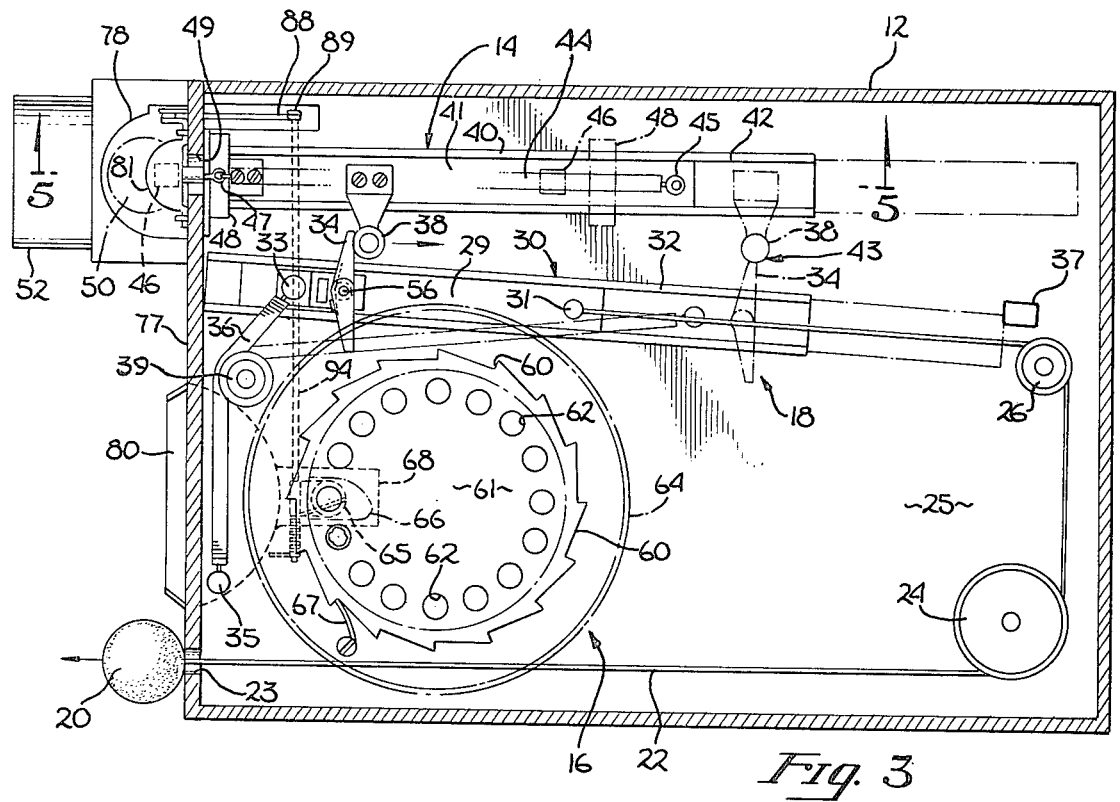
FIG. 3 is a cross-sectional view taken along lines 3—3 of FIG. 1 and showing the internal aspects of the animal training and amusement device of the present invention in the rest position as seen from above.

Referring first to FIGS. 1 and 3, one can see the animal training and amusement device 10 of the present invention. The device 10 comprises a box 12 inside which are disposed a trigger means 18, ball-projecting means 14, a food dispensing means 16, and a food release mechanism 19. The trigger means 18 comprises a cord 22 attached to a triggering assembly 30 which works in conjunction with the ball-projecting means 14 which comprises a piston assembly 40, a piston spring 44 and a chute 52. The food dispensing means 16 comprises a food reservoir 64, the bottom of which is a disc 61 through which food pellets 63 may drop to a hinged plate 70 (see FIG. 6). Said hinged plate 70 is in linkage connection with a food release mechanism 19 which is activated when the ball is retrieved and placed on the roof 99 by the animal.

Figure 5:
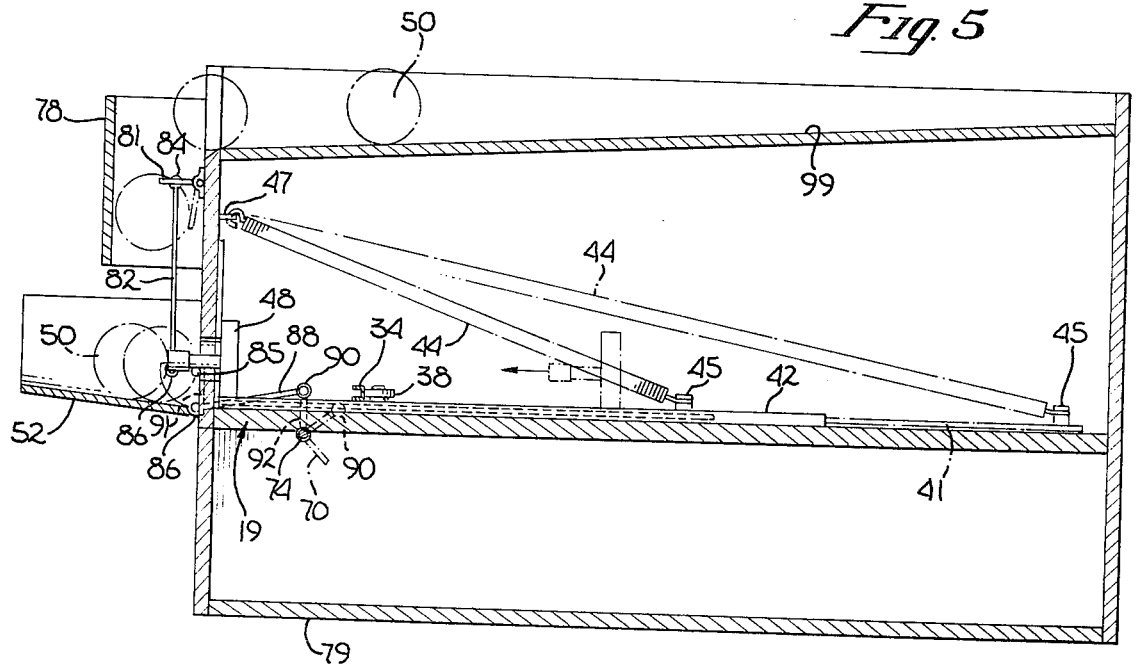
FIG. 5 is a cross-sectional view taken along lines 5—5 of FIG. 3 and showing the internal aspects of the animal training and amusement device of the present invention.

Referring specifically to FIGS. 3 and 5, a handle 20, located on the outside of the box 12 within grasping reach of the animal is connected to a flexible connector means which comprises a cord 22 which extends into the box 12 through hole 23 and continues to the back of the box 12 along floor 25 to pulley 24. Said cord 22 is diverted at a 90 degree angle around said pulley 24 and continues to pulley 26. After being diverted around said pulley 26 at an angle of approximately 100 degrees, said cord 22 continues towards the front of the box 12 where it is attached to the rear of the triggering assembly 30 at post 31.

The triggering assembly 30 comprises a long rectangular block 29 on the top of which are disposed a post 33 at the front end, a winged assembly 34 immediately behind said post 33 and another post 31 disposed at the rear end. Said triggering assembly 30 is disposed within track 32 located on the floor 25 of the box 12 such that said triggering assembly 30 is able to slide forward and backward in said track 32. The backward motion of block 29 is limited by stop 37 mounted on floor 25 so as to protect pulley 26 from contact with block 29 and possible resulting damage. Attached to post 33 is a force means which comprises a spring 36 which runs toward the front wall 77 of the box 12, around a pulley 39, then parallel to the front wall 77 to where its other end is attached to the floor 25 at post 35. Said spring 36 exerts a forward force when said triggering assembly 30 is pulled backward by cord 22.

A means for projecting an object generally comprises a piston assembly 40, a guiding means which comprises track 42 and a force means which comprises a spring 44.

Located adjacent to said triggering assembly 30 on the floor 25 of the box 12 and running approximately 5 to 10 degrees from parallel to the track 32 of said triggering assembly 30 is the piston assembly 40. The long axis of the piston assembly 40 is perpendicular to the plane of the front wall 77 while the long axis of the triggering assembly 30 diverges from the piston assembly 40 such that the rear ends of the two assemblies are further apart than the ends nearest the front wall 77. Said piston assembly 40 comprises a rectangular block 41 on the top of which are disposed a stop 48 at the front end of said rectangular block 41, a mallet means 46 extending forward from said stop 48, a push wheel means 38 located approximately a third of the distance back from the front of said rectangular block 41 and extending laterally, perpendicular to the long axis of said rectangular block 41 in the direction of the triggering assembly 30, and a post 45 extending upward from the rear end of said rectangular block 41. Said piston assembly 40 is disposed within track 42 located on the floor 25 of the box 12 such that said piston assembly 40 is able to slide forward and backward in said piston track 42. Connected to said post 45 is spring 44 which extends along the axis of the rectangular block 41 upward to a point half way up the front wall 77 to which it is connected at eyelet 47. Said piston spring 44 exerts a forward force on said piston assembly 40 when it slides backwards along piston track 42. One arm of the winged assembly 34 located on the triggering assembly 30 is disposed such that it may make contact with push wheel means 38 on the piston assembly 40.

Located in substantially an in-line configuration with the piston assembly 40 and extending outwardly from the front wall 77 is a holding means which comprises a semi-cylindrical chute 52. Said chute 52 is tilted at a slight angle such that the end distal to the front wall 77 is slightly higher than its base at the front wall 77. Thus, a ball 50 when in the ready position will rest on said chute 52 against the front wall 77. The chute 52 is shaped to prevent the removal of the ball 50 from said chute 52 by the animal prior to its projection from the device 10. The hole 49 in front wall 77 through which mallet means 46 moves, is located directly behind said ball 50 when in its above-described rest position. Thus, when the piston assembly 40 is propelled forward along piston track 42 by piston spring 44 the mallet means 46 will extend through hole 49 striking ball 50 and projecting it outward from chute 52. A means for returning said ball 50 when it is retrieved by the animal and deposited on the top of the device 10 is also provided as described more fully hereinbelow.

Figure 6:
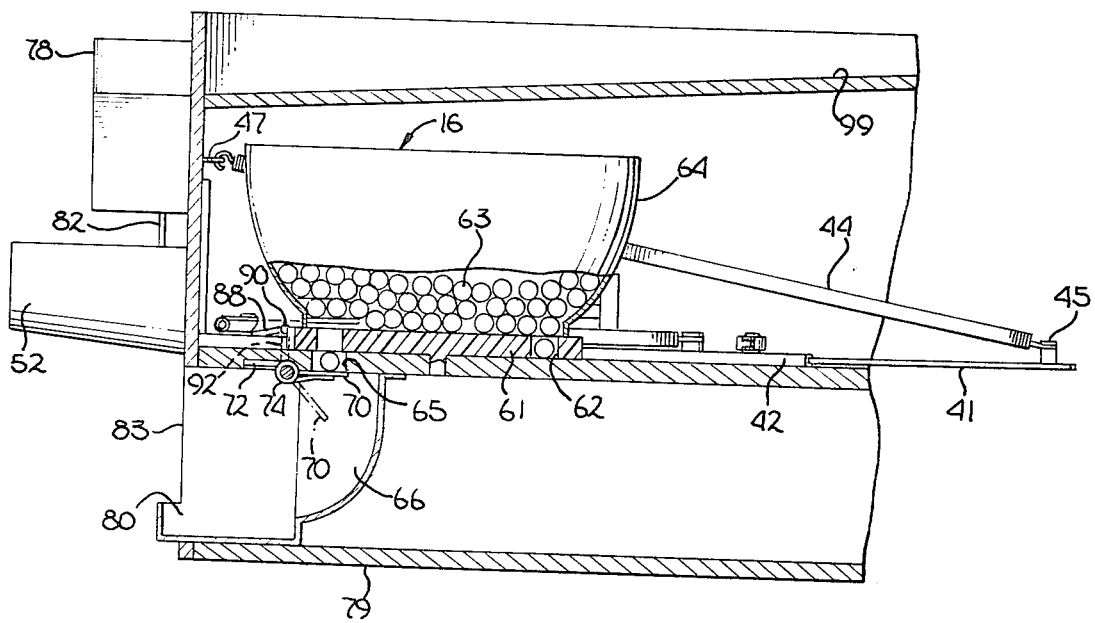
FIG. 6 is a cross-sectional view taken along lines 6—6 of FIG. 4 and showing the internal aspects of the animal training and amusement device of the present invention.

FIGS. 3, 5, and 6, provide the best illustration of the food dispensing means 16 designed to dispense a single food pellet at a time. Located adjacent to the triggering assembly 30 on the side of the floor 25 opposite to the piston assembly 40 is the circular disc 61 which forms the base of the pellet reservoir 64. Around the outer perimeter of said disc 61 are angular sprockets 60. The sprockets nearest the triggering assembly 30 present their flat faces towards the front wall 77. Disposed in a circle about the inner perimeter of the disc 61 are a number of holes 62 into which a single food pellet 63 will fit. A drop hole 65 is disposed in the floor 25 at a point directly under the front most hole 62 of the disc 61. Said disc 61 is rotatable about its axis so that each hole 62 may be disposed sequentially at a given time directly above said drop hole 65 so that the food pellet 63 will drop through said drop hole 65. Horizontally extending from the inner surface of the reservoir 64 at a level immediately above the disc 61 but allowing free rotation of said disc 61, is the drop hole cover 68.

Said drop hole cover is disposed to cover the hole 62 in the pellet disc 61 immediately above the drop hole 65, thus allowing no other food pellets 63 from the reservoir 64 to fall through said hole 62 and said drop hole 65. This allows the dispensing of a single food pellet 63 at a time.

Located directly below the drop hole 65 and preventing complete dispensing of the food pellet 63 is the horizontally disposed hinged plate 70 which may rotate downward about hinge 74 and is held in the horizontal position by spring 72. When said hinge plate 70 is so rotated, the food 63 is allowed to drop downward into chute 66 which leads to food cup 80 which is disposed at the junction of the base 79 and the front wall 77 of the box 12. An opening 83 in the front wall 77 of the box 12 immediately above the food cup allows access to said food cup 80 from the outside by the animal.

A spring bar 67 is positioned to extend into the path of the sprockets 60 on the pellet disc 61 and secured to the floor 25 so that the leading edge of said spring bar 67 will selectively engage each sprocket 60 on its flat face thus preventing rotation in the direction of the flat face of the sprocket 60, but allowing rotation in the direction of the sloped edge of the sprocket 60.

FIGS. 1, 2, 5 and 6, best illustrate the release means of the present invention coupled with the ball return means. A sloped roof panel 99 is disposed near the top edge of the box 12 and covers the entire interior dimensions of said box 12. Said sloped roof panel 99 is also disposed such that its lowest point is at the front corner 98 directly above the chute 52. Also disposed at said corner 98 is an exit hole 76 in the front wall 77 of the box 12. A semi-tubular loading chute 78 is vertically disposed on the front wall 77 such that its axis is vertical and its cut-away side is lined up with the exit hole 76 and hole 49. Thus, when a ball 50 is placed on the sloped roof panel 99 by the retrieving animal, it will automatically roll to the front corner 98, exit through the exit hole 76 and drop through the loading chute 78 onto chute 52 where it will rest until being projected again.

Disposed on front wall 77 directly beneath exit hole 76 and extending outward into loading chute 78 is a hinged trip plate 81. Said hinged trip plate 81 is disposed such that when a ball 50 rolls through the loading chute 78 the weight of the ball 50 will cause the hinged trip plate 81 to rotate downward allowing the ball to pass. The hinged trip plate 81 is connected to the hinged plate 70 by a linkage means described below. Connected to the hinged trip plate 81 at hinge 84 is a vertical rod 82 which is forced downward when the hinged trip plate 81 is moved. Connected to the other end of said rod 82 at hinge 86 is a swinging rod 91 which swings down and toward the front wall 77 about hinge 85 when rod 82 is moved. Also connected to rods 82 and 83 at hinge 86 is a horizontal rod 88 which extends back into the box 12 through a hole in the front wall 77 and is pushed backward when the other rods are moved as described above. Connected to the other end of rod 88 at hinge 90 is rod 92 which is hinged at its opposite end so that it swings from vertical to horizontal in an arc about hinge 89. Also connected to rod 92 at hinge 89 is a linkage rod 94 which extends perpendicular to the plane of the other rods and parallel to the front wall 77 along the floor 25 of the box 12 to hinge 74 which is connected to the hinged plate 70 which supports the food pellet 63. When all the rods are moved, the linkage rod 94 is caused to rotate about its long axis in a clock-wise direction as seen in FIG. 6 which causes the hinged plate 70 to rotate downward allowing the food pellet 63 to drop. After the ball 50 has passed by the hinged trip plate 81, spring 72 attached to hinge 74 exerts an opposite force on all the rods causing them to return to their original position. The loading chute 78 is disposed about said trip plate 81 in such a way as to prevent the animal from gaining access to trip plate 81 and thus causing a food pellet 63 to be released without performing the task of retrieving the ball 50 and placing it one the roof 99.

Figure 4:
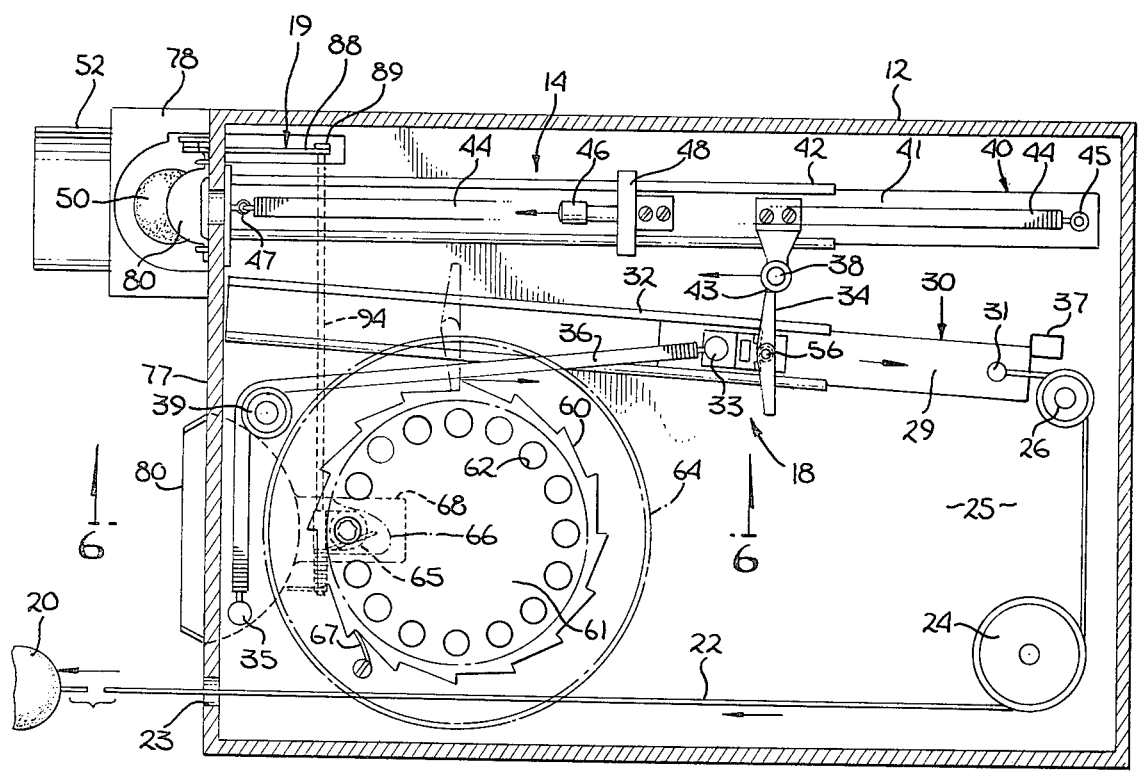
FIG. 4 is a cross-sectional view taken along lines 3—3 of FIG. 1 and showing the internal aspects of the animal training and amusement device of the present invention in the release point position as seen from above.

Operation of the animal training and amusement device of the present invention may best be described with reference to FIGS. 1, 3, 4, and 6. In operation, the animal will pull the handle 20 away from the device 10 which will pull the cord 22 which in turn will pull the triggering assembly 30 backwards in its track 32. The movement of the triggering assembly 30 will cause one wing of the winged assembly 34 to engage the push wheel means 38 attached to the piston assembly 40 thus pushing the piston assembly 40 back along the piston track 42. Due to the fact that the track 32 diverges slightly from the track 42, the point of contact of the winged assembly 34 with the push wheel means 38 will gradually slide out to the end of the winged assembly 34. The fact that the push wheel means 38 will rotate freely means that this sliding effect will cause minimal wearing friction between the two members. The push wheel means 38 will merely rotate in response to the lateral movement of the winged assembly 34. At the position 43 as depicted in FIG. 4, the push wheel means 38 will slide beyond the end of the winged assembly 34 and thereby disengage itself from said winged assembly 34. At this point, the force exerted by spring 44 on the piston assembly 40 will cause said piston assembly 40 to slide rapidly forward in the piston track 42 until the mallet means 46 is extended through the hole 49 in the front wall 77 striking and projecting the ball 50 out the chute 57 and away from the device 10.

While the triggering assembly 30 is being pulled back along the track 32 the opposing wing of the winged assembly 34 will engage the flat surface of a sprocket 60 on the pellet disc 61 thus causing the disc 61 to rotate a fraction of a revolution about its axis, thus aligning the next hole 62 in succession, containing a food pellet 63, directly above drop hole 65. This will cause a food pellet 63 to drop to a release point on top of hinged plate 70. After the position 43 has been reached and the ball projected, the animal will release the handle means pull toy 20 to chase the ball 50. The force exerted by spring 36 on the triggering assembly 30 will cause said triggering assembly 30 to slide forward in its track 32 to its original position. When the back of the winged assembly 34 contacts sprocket 60 and push wheel means 38 from the reverse direction, it will cause the wings to fold about the spring loaded hinge 56 allowing said winged assembly 34 to pass by sprockets 60 and the push wheel means 38 to its original position. The spring in hinge 56 will then cause the wings of the winged assembly 34 to reextend. Similar folding movement in the opposite direction is restricted by stops on the back of the winged assembly 34 thus allowing winged assembly 34 to exert force only while moving in the backward direction as described above.

When the animal retrieves the ball 50 and places it anywhere on the sloped roof panel 99, said ball 50 will roll towards the front corner 98, roll through exit hole 76 and drop through loading chute 78. As the ball 50 drops through loading chute 78 it will contact hinged trip plate 81, which is linked to hinged plate 70 as described above. This causes hinged plate 70 to rotate clockwise as seen in FIG. 6, releasing a food pellet 63 into the chute 66 which empties into the food cup 80 and is available for consumption by the animal. Spring 72 will exert reverse force on hinged plate 70, and thus the linkage to the hinged trip plate 81 causing said hinged trip plate 81 to rotate into its original position. The entire device 10 is now set in its original position ready for a repeat usage.

Located at the front of the device 10 and extending outwardly from the bottom of said device 10 is a platform 95. When pulling on the handle 20, the animal will not cause the entire device 10 to be moved in the direction of its pulling since the animal will be standing on platform 95 which is firmly affixed to the device.

While a wide variety of materials, shapes and other configurations can be used in this invention, it should be understood that changes can be made without departing from the spirit or scope thereof. For example, in the preferred embodiment the linkage means between the trip plate 81 and the hinged plate 70 comprises a series of rods and hinges. The same result could be obtained by means of an electronic connection activated by the trip plate 81. Similarly, while springs are used generally to power the mechanisms, thus requiring no outside power source, such as electricity, a series of motors could be used to replace the springs. This invention, therefore, is not to be limited to the specific embodiments discussed and illustrated herein.

What is claimed is:

1. An animal training and amusement device, comprising:
   a means for projecting an object through the air away from the device;
   a means for dispensing a food pellet to a release point not accessible by an animal;
   a trigger means coupled to said projecting means and said dispensing means for triggering operation of said projecting and dispensing means; and
   a means for releasing said food pellet coupled to said release point such that return of said object to said device and placement of said object in a preselected position operates said releasing means to release said food pellet for access by an animal and prepares said device for repeated operation.

2. The device according to claim 1 wherein said means for projecting comprises a piston means for impacting said object, a force means for propelling said piston means, a guiding means for guiding said piston means and a means for holding said object in position for contact with said piston means.

3. The device according to claim 2 further comprising a means for returning said object to its original position, ready for repeated operation.

4. The device according to claim 3 wherein said piston means comprises a generally rectangular block with a mallet means at its front end for striking said object.

5. The device according to claim 3 wherein said force means comprises a spring coupled at one end to said piston means and the other end to a fixed point at the forward end of said device.

6. The device according to claim 3 wherein said guiding means comprises a track inside of which the bottom portion of said piston means is disposed and in which said piston means is capable of sliding movement forward and backward in said device.

7. The device according to claim 3 wherein said means for holding said object comprises a generally semi-tubular chute which also guides said object in its flight from said device.

8. The device according to claim 3 wherein said means for holding said object comprises a generally semi-tubular chute which is shaped to prevent access to said object by the animal prior to the projecting of said object.

9. The device according to claim 3 wherein said return means comprises a top for said device sloped in such a way as to cause the object to roll to a point just above said holding means, where it will drop off said top onto said holding means.

10. The device according to claim 9 wherein said return means is utilized by the placement of the object anywhere on said top by the animal, thus requiring no human intervention for resetting said device.

11. The device according to claim 1 wherein said dispensing means comprises a disc for holding single food pellets in a position ready for dispensing, a drop hole for allowing the dispensing of a single food pellet at a time, a drop hole cover for preventing the entry of more than a single food pellet into said drop hole, a hinged plate for supporting the food pellet within said drop hole in a position ready for releasing, and a reservoir for storing said food pellets.

12. The device according to claim 11 wherein said disc comprises the circular base of said reservoir.

13. The device according to claim 11 wherein said disc has a circular series of holes about its outer edge.

14. The device according to claim 11 wherein said drop hole is located directly below the forwardmost hole in said disc.

15. The device according to claim 14 wherein said disc is rotatable about its axis so that each hole in said disc may be positioned above said drop hole in succession.

16. The device according to claim 15 wherein said disc has a series of sprockets disposed about its outer circumference for engaging said trigger means.

17. The device according to claim 15 wherein said drop hole cover comprises a plate disposed directly above said drop hole means and immediately above said disc while still allowing free rotation of said disc.

18. The device according to claim 15 wherein said hinged plate is disposed directly beneath said drop hole and comprises a spring loaded plate hinged about a horizontal axis for holding said food pellet in said drop hole.

19. The device according to claim 18 wherein said hinged plate is connected to releasing means such that operation of said releasing means causes said hinged plate to rotate thus releasing the food pellet dispensed thereon into a pellet cup.

20. The device according to claim 1 wherein said trigger means comprises a flexible connector for pulling a triggering assembly and a force means for exerting an opposing force on said triggering assembly.

21. The device according to claim 20 wherein said flexible connector means is attached at one end to said triggering assembly and at the other end to a handle means.

22. The device according to claim 21 wherein said flexible connector means is positioned so that pulling of said handle means by the animal will cause said triggering assembly to slide backward.

23. The device according to claim 21 wherein said triggering assembly comprises a generally rectangular block on which is disposed a winged assembly for engaging said trigger means and said dispensing means.

24. The device according to claim 23 wherein said winged assembly causes said projecting means to slide back in concert with said triggering assembly.

25. The device according to claim 24 wherein said winged assembly means causes said dispensing means to rotate a fraction of a revolution about its axis as said triggering assembly is pulled backward.

26. The device according to claim 25 wherein said triggering assembly is guided by a track so that its path diverges slightly from that of said projecting means to a point where said winged assembly is caused to disengage from said projecting means.

27. The device according to claim 26 wherein said force means comprises a spring attached at one end to said triggering assembly and at the other end at a forward point in said device, disposed such that upon release of said flexible connector means, said force means causes said triggering assembly to slide forward in said track to its original position.

28. The device according to claim 1 wherein said releasing means comprises a trip plate for activating a linkage means which causes a hinged plate of said dispensing means to rotate, thus releasing said food pellet into a cup.

29. The device according to claim 28 wherein said releasing means further comprises a sloped roof to said device for guiding the object to a point directly above said trip plate where said object is allowed to fall onto said trip plate, thereby causing said trip plate to move downward.

30. The device according to claim 29 wherein said releasing means further comprises a drop chute for guiding the fall path of said object and also for guarding said trip plate means from activation by the animal.

31. The device according to claim 29 wherein said linkage means comprises a series of linked rods and hinges.

32. The device according to claim 31 wherein said releasing means is caused to reset to its original position by an opposing force exerted by a spring attached to said hinged plate.

33. The device according to claim 1 wherein all said means are completely operable by the animal, requiring no human intervention.

34. An animal training and amusement device comprising:
 a means for projecting an object through the air wherein said projecting means comprises a piston means for impacting said object, a force means for propelling said piston means and a guiding means for guiding said piston means;
 a means for dispensing a food pellet to a release point wherein said dispensing means comprises a disc for holding single food pellets which is rotatable about its axis, a drop hole for allowing the dispensing of a single food pellet at a time, a hinged plate for supporting said food pellet within said drop hole at said release point and a reservoir for storing said food pellet;
 a trigger means coupled to said projecting means and said dispensing means for triggering operation of said projecting and dispensing means wherein said trigger means comprises a flexible connector for pulling a triggering assembly which comprises a rectangular block and a winged assembly which engages said disc and said piston means, said block guided by a track which diverges slightly from said guiding means for said piston means, and a force means for exerting an opposing force on said triggering assembly; and
 a means for releasing coupled to said release point such that placement of said object in a preselected position operates said releasing means to release said food pellet to an animal and prepares said device for repeated operation wherein said releasing means comprises a trip plate for activating a linkage means which causes said hinged plate of said dispensing means to rotate, thus releasing said food pellet into a cup.

35. The device according to claim 34 wherein all said means are completely operable by the animal, requiring no human intervention to prepare said device for repeated operation.

36. An animal training and amusement device, comprising:
 a means for projecting an object through the air away from the device;
 a means for releasing a food pellet;
 a trigger means coupled to said projecting means for triggering operation of said projecting means; and
 a means for activating said releasing means when said object is returned to said device and placed in a preselected position wherein said return and placement of said object also resets said device for repeated operation.

* * * * *